(12) United States Patent
    Bullock

(10) Patent No.:    US 12,559,020 B2
(45) Date of Patent:       Feb. 24, 2026

(54) DUAL MODE CARGO RESTRAINT

(71) Applicant: Matthew Bullock, McLean, VA (US)

(72) Inventor: Matthew Bullock, McLean, VA (US)

(73) Assignee: MBull Holdings, LLC, North Miami Beach, FL (US)

( * ) Notice: Subject to any disclaimer, the term of this patent is extended or adjusted under 35 U.S.C. 154(b) by 826 days.

(21) Appl. No.: 17/851,280

(22) Filed: Jun. 28, 2022

(65) Prior Publication Data

US 2023/0415632 A1      Dec. 28, 2023

(51) Int. Cl.
    B60P 7/08       (2006.01)
    B60P 7/14       (2006.01)
    B65D 88/12      (2006.01)
    B65D 90/00      (2006.01)
(52) U.S. Cl.
    CPC ............... B60P 7/0823 (2013.01); B60P 7/14 (2013.01); B65D 88/121 (2013.01); B65D 90/0053 (2013.01)
(58) Field of Classification Search
    CPC .. B65D 88/121; B60P 7/10; B60P 7/12; B60P 7/14; B60P 7/16; B60P 7/0823; B61D 45/00
    USPC ...... 410/32, 34, 36, 42, 87, 88, 96, 97, 100, 410/117, 118, 121, 129, 154, 155, 102; 206/410, 523, 524, 591, 593, 597; 248/354.1, 499; 220/1.5; 53/399, 441, 53/462, 556
    See application file for complete search history.

(56) References Cited

U.S. PATENT DOCUMENTS

| | | | |
|---|---|---|---|
| 2,674,206 | A | 4/1954 | Scott |
| 3,059,593 | A | 10/1962 | Mack |
| 3,072,270 | A | 1/1963 | Tolby et al. |
| 3,199,689 | A | 8/1965 | Feldkamp |
| 3,314,379 | A | 4/1967 | Krokos |
| 3,336,069 | A | 8/1967 | Bayer et al. |
| 3,413,932 | A | 12/1968 | Bennett |
| 3,421,451 | A | 1/1969 | Brucks |
| 3,424,108 | A | 1/1969 | Vargen |
| 3,462,027 | A | 8/1969 | Puckhaber |
| 3,581,674 | A | 6/1971 | O'Leary |
| 3,722,429 | A | 3/1973 | Holt et al. |
| 3,767,066 | A | 10/1973 | Martin et al. |
| 3,767,253 | A | 10/1973 | Kluetsch |
| 3,872,799 | A | 3/1975 | Dousset |
| 3,985,242 | A | 10/1976 | Schlaeger |
| 4,247,237 | A | 1/1981 | Brown |
| 4,264,251 | A | 4/1981 | Blatt |
| 4,300,864 | A | 11/1981 | Liebel et al. |

(Continued)

FOREIGN PATENT DOCUMENTS

| | | |
|---|---|---|
| DE | 3422041 A1 | 12/1985 |
| WO | WO-9400350 A1 * | 1/1994 ............. B65D 19/44 |

OTHER PUBLICATIONS

Materials downloaded Sep. 29, 2020 from shockguard.net.

*Primary Examiner* — Amy R Weisberg

(74) *Attorney, Agent, or Firm* — Banner & Witcoff, Ltd.

(57)          ABSTRACT

One or more polymer foam-cored cargo restraint panels may be placed adjacent to a stack of cargo units in a cargo container. Tails of the load restraint strips may be wrapped around the cargo restraint panels, tensioned, and secured together. The wrapped load restraint strip tails may be tensioned using a tensioning tool or using elastic strips, and the wrapped and tensioned tails may be secured together.

20 Claims, 15 Drawing Sheets

(56)  References Cited

U.S. PATENT DOCUMENTS

| | | | | |
|---|---|---|---|---|
| 4,396,325 | A | | 8/1983 | Joice-Cavanagh |
| 4,566,831 | A | | 1/1986 | Groth |
| 4,780,034 | A | | 10/1988 | Skotte |
| 4,854,460 | A | * | 8/1989 | Josephs ............... B65D 88/121 |
| | | | | 220/1.5 |
| 4,854,792 | A | | 8/1989 | Cottone |
| 4,880,342 | A | | 11/1989 | Pradovic |
| 4,886,404 | A | | 12/1989 | Jensen et al. |
| 5,010,943 | A | | 4/1991 | Boyer |
| 5,080,950 | A | | 1/1992 | Burke |
| 5,132,156 | A | | 7/1992 | Trassare, Jr. et al. |
| 5,269,639 | A | | 12/1993 | Ryder, Jr. |
| 5,678,968 | A | | 10/1997 | Bourgeois et al. |
| 5,709,512 | A | | 1/1998 | Smith |
| 5,741,098 | A | | 4/1998 | Letts, III |
| 5,772,369 | A | * | 6/1998 | Lerman ................. B65D 19/44 |
| | | | | 108/55.5 |
| 5,784,761 | A | * | 7/1998 | Allen .................... B60P 7/0823 |
| | | | | 410/97 |
| 5,855,459 | A | | 1/1999 | Krier et al. |
| 6,017,175 | A | | 1/2000 | Kassab et al. |
| 6,089,802 | A | | 7/2000 | Bullock |
| 6,099,221 | A | * | 8/2000 | Takagi ................. B60P 7/0823 |
| | | | | 410/97 |
| 6,106,205 | A | * | 8/2000 | Haire ........................ B60P 7/15 |
| | | | | 410/101 |
| 6,227,779 | B1 | | 5/2001 | Bullock |
| 6,527,488 | B2 | | 3/2003 | Elze et al. |
| 6,607,337 | B1 | * | 8/2003 | Bullock ................ B60P 7/0823 |
| | | | | 410/97 |
| 6,896,459 | B1 | | 5/2005 | Bullock |
| 6,923,609 | B2 | | 8/2005 | Bullock |
| 6,981,827 | B2 | | 1/2006 | Bullock |
| 7,018,151 | B2 | | 3/2006 | Bullock |
| 7,066,698 | B2 | | 6/2006 | Bullock |
| 7,137,765 | B1 | | 11/2006 | Elze et al. |
| 7,290,969 | B2 | | 11/2007 | Bullock |
| 7,322,781 | B2 | | 1/2008 | Bullock |
| 7,329,074 | B2 | | 2/2008 | Bullock |
| 7,458,755 | B2 | | 12/2008 | Ramirez et al. |
| 7,604,443 | B2 | | 10/2009 | Bullock |
| 7,708,508 | B2 | | 5/2010 | Bullock |
| 7,726,920 | B2 | | 6/2010 | Bullock |
| 7,789,604 | B2 | | 9/2010 | Rotche |
| 7,798,754 | B2 | | 9/2010 | Funk et al. |
| 8,113,752 | B2 | | 2/2012 | Bullock |
| 8,128,324 | B2 | * | 3/2012 | Bullock ................. B60P 7/135 |
| | | | | 410/97 |
| 8,128,327 | B2 | | 3/2012 | Jevaney |
| 8,308,411 | B2 | | 11/2012 | Funk et al. |
| 8,398,343 | B1 | | 3/2013 | Henley et al. |
| 8,398,344 | B2 | | 3/2013 | Bullock |
| 8,403,607 | B1 | | 3/2013 | Bullock |
| 8,403,608 | B1 | | 3/2013 | Bullock |
| 8,403,609 | B1 | | 3/2013 | Bullock |
| 8,408,852 | B1 | | 4/2013 | Bullock |
| 8,419,329 | B1 | | 4/2013 | Bullock |
| 8,727,682 | B2 | | 5/2014 | Johnson et al. |
| 8,888,424 | B1 | | 11/2014 | Bullock |
| 8,979,449 | B2 | * | 3/2015 | Bullock ................ B60P 7/0823 |
| | | | | 410/96 |
| 9,090,194 | B1 | | 7/2015 | Bullock |
| 9,333,899 | B1 | * | 5/2016 | Bullock .................... B60P 7/16 |
| 9,637,044 | B2 | | 5/2017 | Bullock |
| 10,112,525 | B1 | | 10/2018 | Bullock |
| 10,132,911 | B1 | | 11/2018 | Bullock |
| 10,427,583 | B2 | | 10/2019 | Bullock |
| 10,654,399 | B2 | | 5/2020 | Bullock |
| 11,220,205 | B2 | | 1/2022 | Bullock |
| 2003/0206782 | A1 | | 11/2003 | Toglia |
| 2008/0047210 | A1 | | 2/2008 | Bell |
| 2008/0131226 | A1 | | 6/2008 | Pesson |
| 2010/0092264 | A1 | | 4/2010 | Jevaney |
| 2011/0033258 | A1 | | 2/2011 | Unander |
| 2012/0099941 | A1 | | 4/2012 | Larsh et al. |
| 2014/0105703 | A1 | | 4/2014 | Kvilhaug et al. |
| 2014/0271022 | A1 | | 9/2014 | Ridgeway |
| 2018/0264989 | A1 | * | 9/2018 | Marshall .............. B61D 45/001 |
| 2022/0097596 | A1 | | 3/2022 | Bullock |

* cited by examiner

DUAL MODE CARGO RESTRAINT

BACKGROUND

When transporting cargo in a truck or other type of cargo container, the cargo should be secured to prevent shifting and/or damage. If the cargo comprises numerous discrete cargo units that are relatively small and/or lightweight (e.g., cardboard boxes), and that may vary in size and quantity, securing that cargo may present additional challenges.

SUMMARY

This Summary is provided to introduce a selection of some concepts in a simplified form as a prelude to the Detailed Description. This Summary is not intended to identify key or essential features.

Described herein are systems and methods for securing cargo units in a cargo container using load restraint strips and cargo restraint panels. Attachment regions of load restraint strips may be affixed to interior walls of a cargo container. Cargo units may be stacked in the container, and one or more polymer foam-cored cargo restraint panels placed adjacent to that stack. Tails of the load restraint strips may be wrapped around the cargo restraint panels, tensioned, and secured together. The wrapped load restraint strip tails may be tensioned using a tensioning tool or using elastic strips, and the wrapped and tensioned tails may be secured together.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

DETAILED DESCRIPTION

Securing a cargo load comprising numerous discrete cargo units of varying sizes presents various challenges, particularly if some or all of those cargo units are relatively small in size (e.g., 4 cubic feet (cu. ft.) or less) and/or relatively lightweight (e.g., less than 25 pounds). These challenges may be more acute if the cargo units are not palletized or otherwise secured to one another. For example, a semi truck or other cargo container may be loaded with numerous cardboard boxes or other cargo units that are stacked on stop of one another, and that rest directly on a floor of the cargo container. Known solutions for securing such loads may rely on movable partitions that may be expensive and/or heavy, that may require customized brackets or other hardware to secure in place, and/or that may have other disadvantages.

Some or all of these disadvantages may be addressed using dual mode cargo restraint systems and methods such as are described herein. Such dual mode cargo restraint systems may comprise lightweight, compressible cargo restraint panels having polymer foam cores, as well as load restraint strips. The cargo restraint panels may be placed adjacent to (e.g., against and/or in contact with) a face of a cargo unit stack. Adhesive portions of the load restraint strips may be attached to interior walls of the cargo container, and tails of the load restraint strips wrapped around the placed cargo restraint panels and secured together. Once the tails are secured to one another, the cargo restraint panels are secured in place. The compressible nature of the cargo panels, combined with the adaptable tension applied to the load restraint strip tails, allows those panels to be easily pressed against the cargo unit stack with relatively modest pressure. This results in a bulkhead that securely holds the cargo units in place without unduly compressing, crushing or otherwise damaging the cargo units.

FIGS. 1A, 1B, 1C, 1D, 1E, 1F, 1G, and 1H show an example cargo container 100 during various stages of an example method for dual mode cargo restraint. As indicated by the wheels 101, the cargo container 100 may comprise a semi trailer. Also or alternatively, dual mode cargo restraint as described herein can be used in a cargo container that may comprise another type of truck (or portion of another type of truck) used for transportation of cargo via roads, a shipping container, a rail car, or any other type of container used to hold cargo during transport. In each of FIGS. 1A through 1H, a rear end 102 of the cargo container may comprise doors (not shown) used to close the cargo container 100. Portions of a top and or a right side wall of the cargo container 100 have been omitted in FIGS. 1A through 1H to show interior details.

Figure 1A:
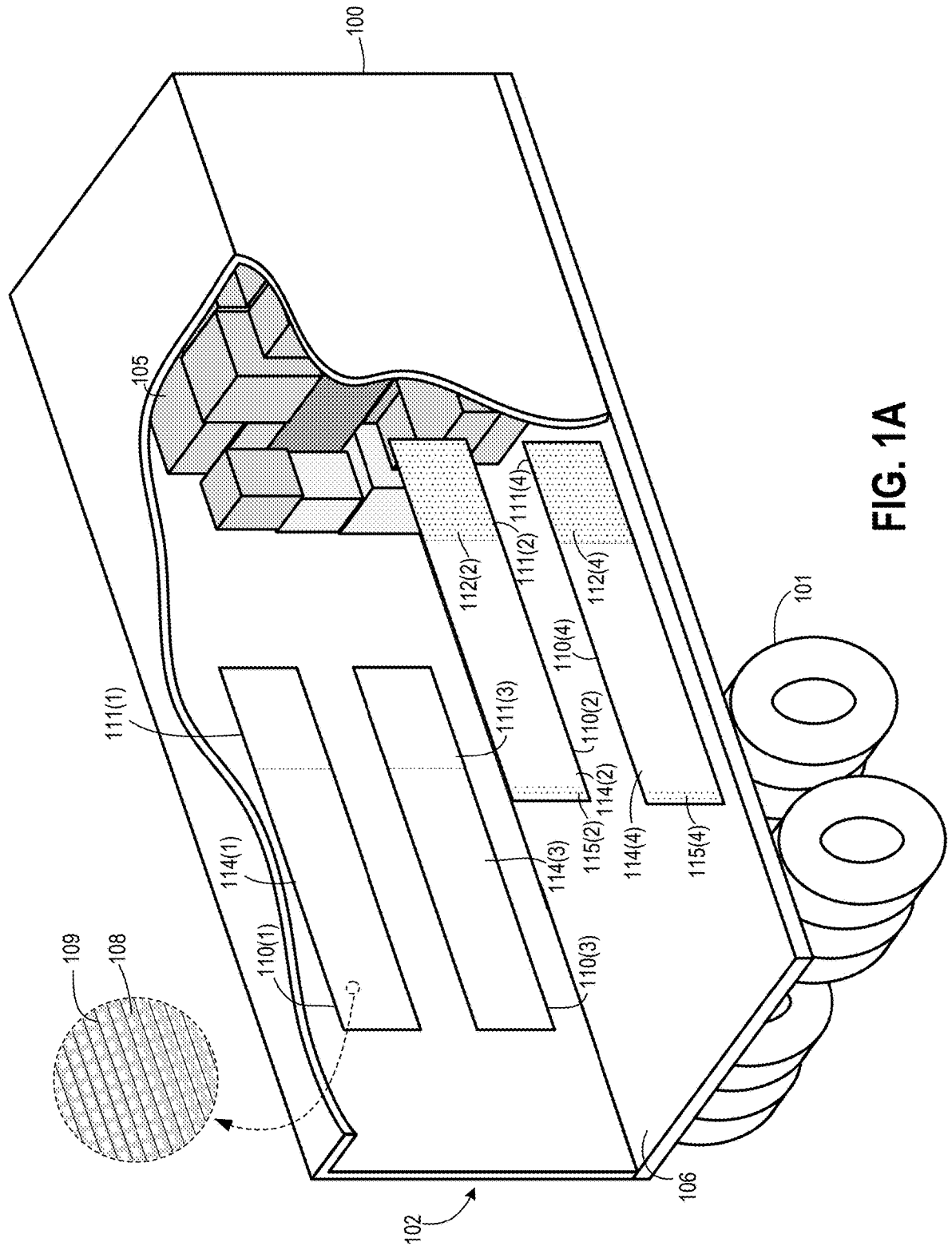
FIGS. 1A, 1B, 1C, 1D, 1E, 1F, 1G, and 1H show an example cargo container during various stages of an example method for dual mode cargo restraint.

As shown in FIG. 1A, a front portion of the cargo container 100 has already been loaded with multiple cargo units 105. The cargo units 105 may, for example, comprise boxes, cartons, and/or other types of containers. The cargo units may be a varying sizes, but may be small in size relative in an interior space of the cargo container 100. For example, an average volume of the cargo units 105 may be 3.375 cubic feet (cu. ft.) or less (e.g., 3.5 cu. ft., 3 cu. ft., 2.5 cu. ft., 2 cu. ft., 1.5 cu. ft., 1 cu. ft., etc.) per cargo unit 105. In the example of FIGS. 1A through 1H, the cargo units 105 are not palletized and may be loaded directly onto a floor 106 of the cargo container 100. The cargo units 105 may be stacked directly on one another and may extend from the floor 106 to (or near) an interior surface of the top of the cargo container 100, from an interior front wall of the cargo container 100, and from an interior left wall of the cargo container 100 to an interior of the right wall of the cargo container 100.

Also shown in FIG. 1A are four load restraint strips 110(1), 110(2), 110(3), and 110(4) (collectively referred to load restraint strips 110; generically referred to as load restraint strip 110). The load restraint strips 110 may all have a similar structure. As shown in the enlargement in FIG. 1A, each load restraint strip 110 may comprise a base layer 108 and a reinforcing layer 109 fixed to the base layer. Each of the load restraint strips 110 may further comprise an adhesive layer in an attachment region. Each of load restraint strips 110 may, for example, have a structure such as that described in any of U.S. Pat. Nos. 6,089,802, 6,227,779, 6,607,337, 6,896,459, 6,923,609, 7,018,151, 7,066,698, 7,290,969, 7,329,074, 8,113,752, 8,128,324, 8,403,607, 8,403,608, 8,403,609, 8,408,852, 8,419,329, 8,979,449, 9,090,194, and 10,654,399. All of said patents are incorporated by reference herein. Additional examples include, without limitation, load restraint strips sold under the name Ty-Gard 2000® and load restraint strips sold under the name Ty-Gard DS™ by Walnut Industries, Inc. of Bensalem, PA, US. The base layer 108, which may extend the entire length and width of the load restraint strip 110, may for example, comprise a non-woven spun-bonded material, a stitch-bonded material, or other type of material. The reinforcing layer 109, which may also extend the entire length and width of the load restraint strip 110, may, for example, comprise strands of reinforcing material (e.g., polyester fibers) that extend lengthwise along the load restraint strip 110. An adhesive layer may, for example, comprise a layer of adhesive applied to an attachment region located at one end of a load restraint strip 110.

In FIG. 1A, adhesive (not visible in FIG. 1A) of attachment regions 111(1) and 111(3) of the load restraint strips 110(1) and 110(3), respectively, is in contact with, and adhered to, the interior right wall of the cargo container 100. Adhesive 112(2) in attachment region 111(2) of the load restraint strip 100(2), as well as adhesive 112(4) in the attachment region 111(4) of the load restraint strip 100(4), is in contact with and adhered to the left interior wall of the cargo container 100. A tail 114(2) of the load restraint strip 110(2) extends from the attachment region 111(2) toward the rear 102 of the cargo container 100 and is held in place by an additional adhesive region 115(2) located near the end of the load restraint strip 110(2). A tail 114(4) of the load restraint strip 110(4) extends from the attachment region 111(4) toward the rear 102 of the cargo container 100 and is held in place by an additional adhesive region 115(4) located near the end of the load restraint strip 110(4). Similarly, tails 114(1) and 114(3) of the load restraint strips 110(1) and 110(3) extend from the attachment regions 111(1) and 111(3) toward the rear 102 and are held in place by additional adhesive regions, not shown, similar to the additional adhesive regions 115(2) and 115(4). So that the tails 114(1) through 114(4) may be easily pulled away from the interior walls, the additional adhesive regions 115(3) and 115(4) (and similar additional adhesive regions of the tails 114(1) and 114(3)) may be relatively small and/or may comprise an adhesive that has less bonding strength than the adhesive in the attachment regions 111(1) through 111(4).

Figure 1B:
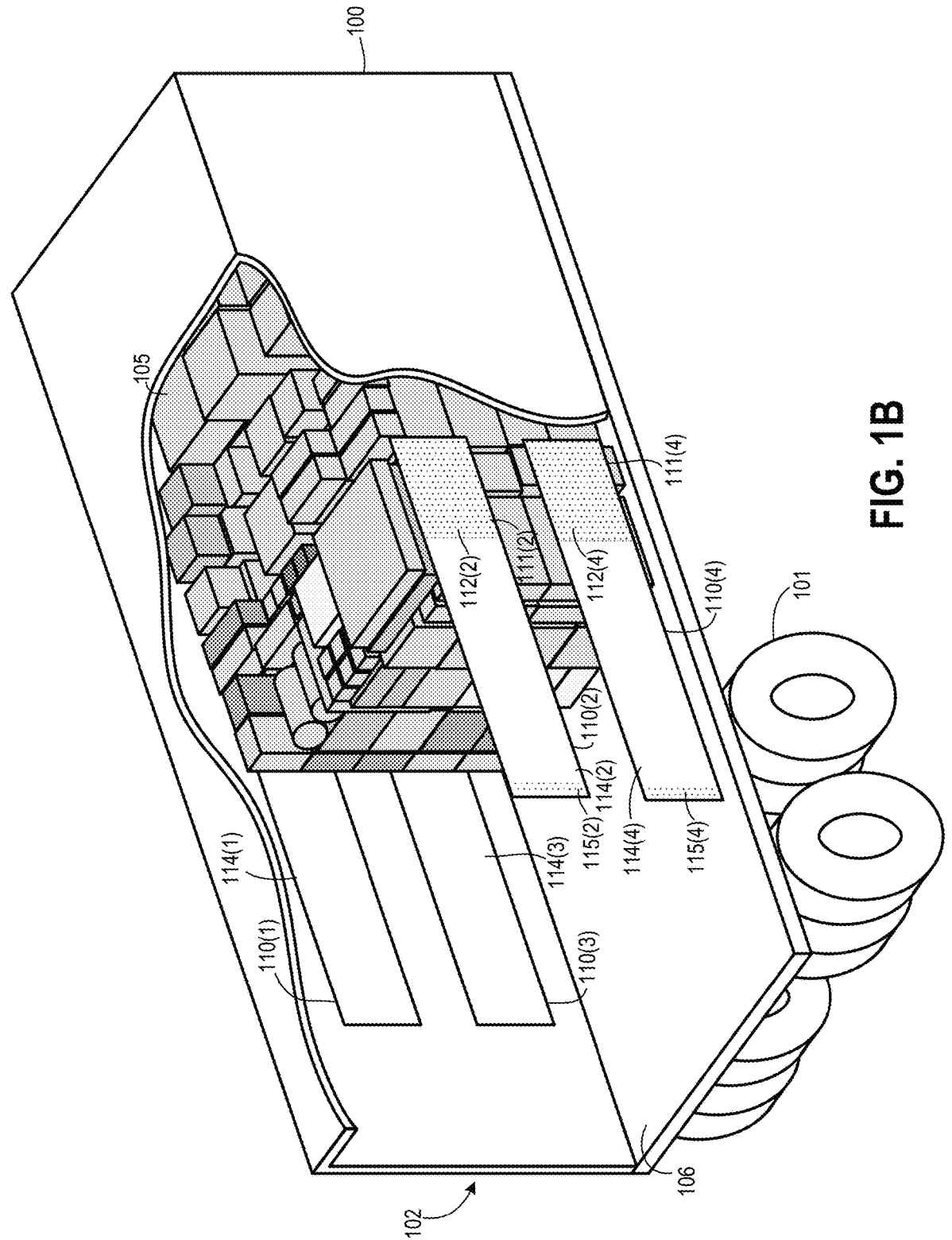

In FIG. 1B, loading of the cargo units 105 has continued until a rear face of a stack of the cargo units 105 has reached a position in the interior of the cargo container 100 that is past the rear-most portions of the attachment regions 111(1) through 111(4). The stack of cargo units 105, which extends from the left interior wall of the cargo container 100 to the right interior wall of the cargo container 100, comprises at least four cargo units in the horizontal direction and at least four cargo units in the vertical direction. Because the cargo units 105 are not of uniform size or shape, some parts of the stack comprise more than four cargo units in the horizontal direction and more than four cargo units in the vertical direction. As can be appreciated from FIG. 1B, the stack of cargo units 105 would quickly become unstable if the cargo container 100 were to move forward with even modest acceleration. Unlike larger types of cargo, however, securing the load restraint strips 110 around the rear of the stack may not, without more, provide sufficient restraint. Cargo units not covered by one of the load restraint strips 110 may slip through a gap. Even if one of the cargo units 105 only partially dislodges to extend through such a gap, the resulting void in the stack could cause other cargo units 105 to shift and/or be damaged. Although additional and/or larger load restraint strips could be added to prevent gaps, this would not address another problem. In particular, if the load restraint strips 110 were directly wrapped around the end of the cargo unit 105 stack, the tension in the load restraint strips 110 (from tightening during securement and/or from force of the cargo units 105 pressing against the load restraint strips 110) would tend to crush and/or dislodge cargo units 105 at the rear corners of the stack. To address this problem, one or more cargo restraint panels may be placed at the rear of the stack of cargo units 105, and the load restraint strips 110 may then be secured around those cargo restraint panels.

Figure 1C:
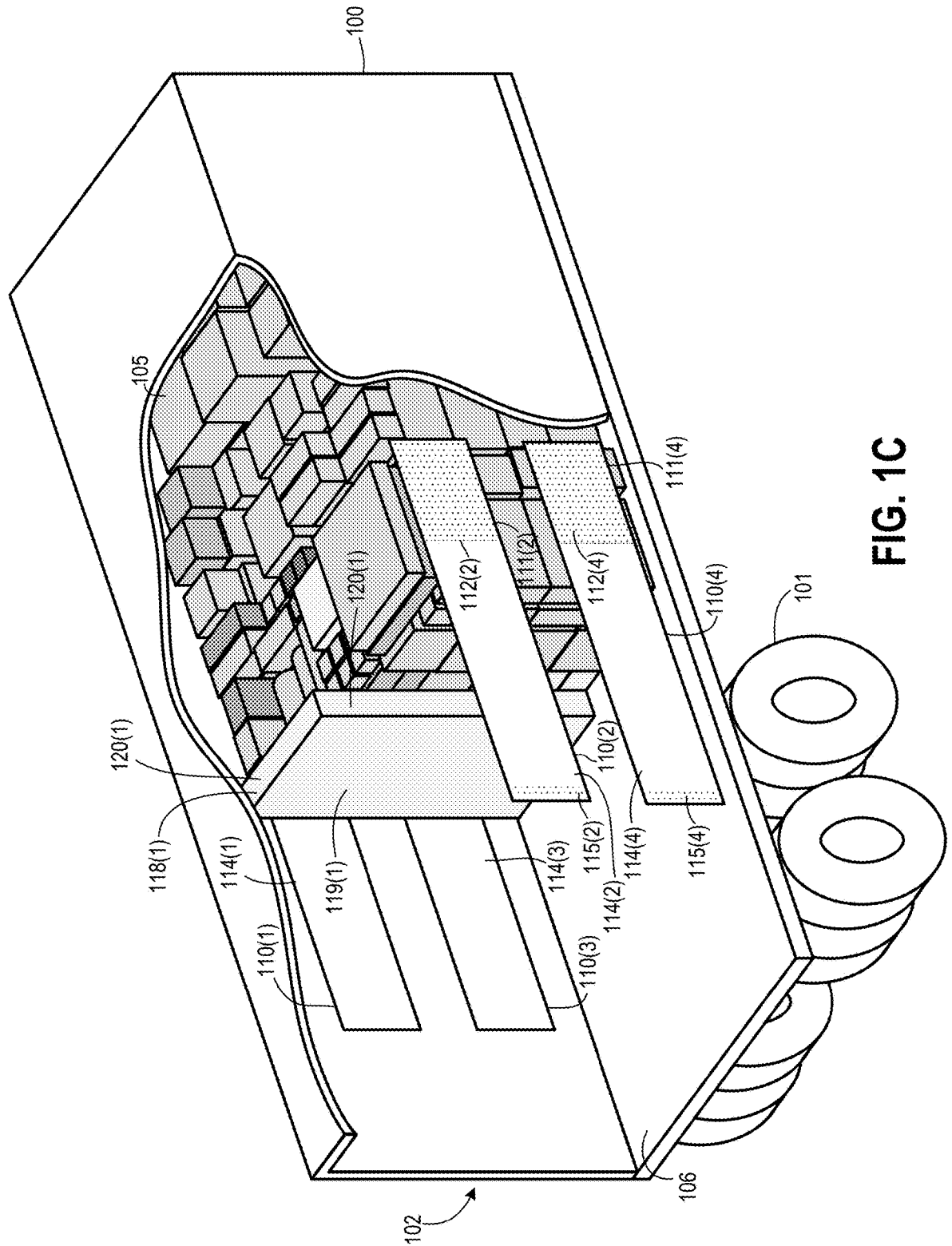

In FIG. 1C, a first cargo restraint panel 118(1) has been placed adjacent to (e.g., against and/or in contact with) the rear face of the stack of cargo units 105. The first cargo restraint panel 118(1) may comprise a polymer foam core, a first major surface (not visible in FIG. 1C) facing the stack of cargo units 105, a second major surface 119(1) (which may be the same as or similar to the first major surface) facing away from the stack, and a plurality of sides 120(1) (only two of which are shown in FIG. 1C) that connect the first face and the second face 119(1). The first cargo restraint panel 118(1) may, for example, comprise a cargo restraint panel such as is described in U.S. Pat. No. 11,220,205 and/or as is described in U.S. Patent Application Publication No. 2022/0097596, which patent and patent application publication are incorporated by reference herein. The first cargo restraint panel 118(1) may rest on the floor 106, and may extend above the stack of cargo units 105. A side of the first cargo restraint panel 118(1) may be positioned near (or abutting) the interior left wall of the cargo container 100. In the example of FIG. 1C, the sides of the first cargo restraint panel 118(1) are not mechanically interlocked with the floor 106, with the left interior wall, or with the ceiling of the cargo container 100. For example, there are no bolts, hooks, latches, or other mechanical elements that link the bottom side to the floor 106, that link the left side to the interior left wall, or that link the top side to the ceiling.

Figure 1D:
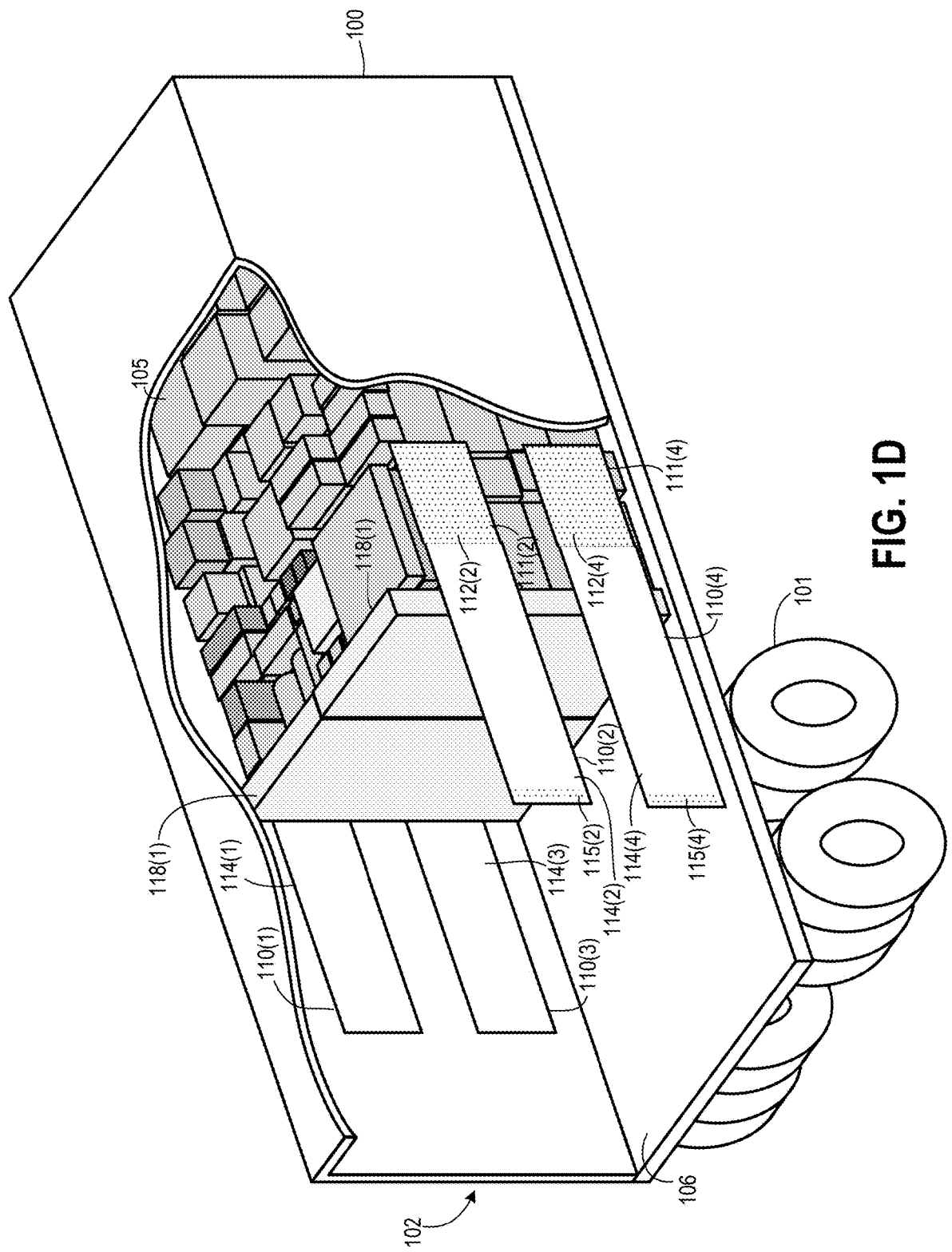

In FIG. 1D, a second cargo restraint panel 118(2) has been placed adjacent to (e.g., against and/or in contact with) the rear face of the stack of cargo units 105. The second cargo restraint panel 118(2) may also comprise a polymer foam core, first and second major surfaces respectively facing and facing away from the stack of cargo units 105, and sides connecting the first and second major surfaces. The second cargo restraint panel 118(2) may be the same as or similar to the first cargo restraint panel 118(1), or the second cargo restraint panel 118(2) may have a different size, shape, and/or structure (e.g., a structure such as is described in one or more of U.S. Pat. No. 11,220,205 or U.S. Patent Application Publication No. 2022/0097596, but that is different from the structure of the first cargo restraint panel 118(1)). The second cargo restraint panel 118(2) may rest on the floor 106 and may extend above the stack of cargo units 105. A side of the second cargo restraint panel 118(2) may be positioned adjacent (or abutting) a side of the first cargo restraint panel 118(2), and another side of the second cargo restraint panel 118(2) may be positioned near (or abutting) the interior right wall of the cargo container 100. In the example of FIG. 1D, the sides of the second cargo restraint panel 118(2) are not mechanically interlocked with the floor 106, with the right interior wall, or with the ceiling of the cargo container 100, and the adjacent sides of the first and second cargo restraint panels 118(1) and 118(2) are not mechanically interlinked.

Figure 1E:
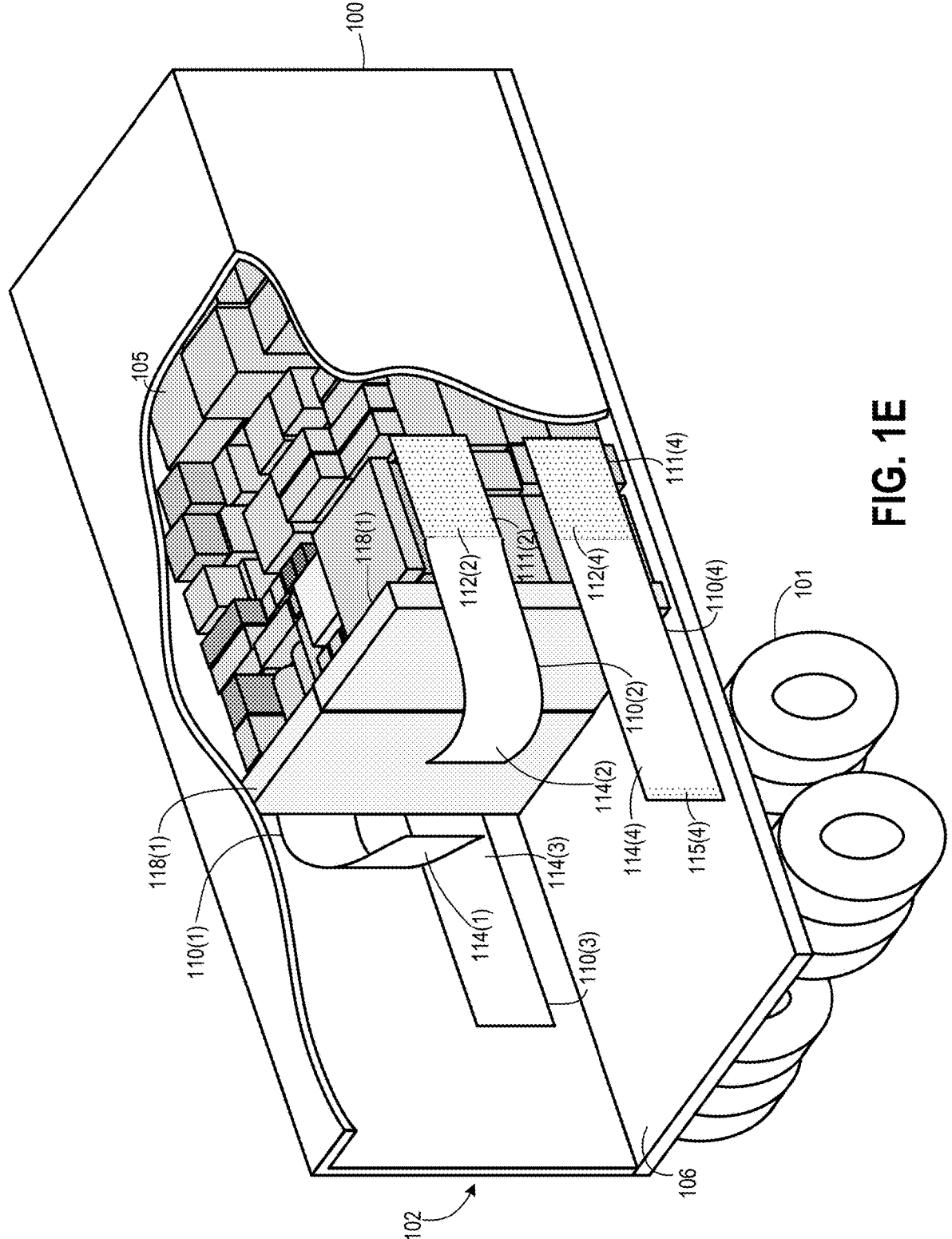

In FIG. 1E, the tails 114(1) and 114(2) of the load restraint strips 110(1) and 110(2) are pulled away from the interior walls and are wrapped around the first and second cargo restraint panels 118(1) and 118(2). In particular, the tail 114(1) of the first load restraint strip 110(1) is wrapped around, and brought into contact with, the second major surface 119(1) of the first cargo restraint panel 118(1), and the tail 114(2) of the second load restraint strip 110(2) is wrapped around, and brought into contact with, the second major surface of the second cargo restraint panel 118(2).

Figure 1F:
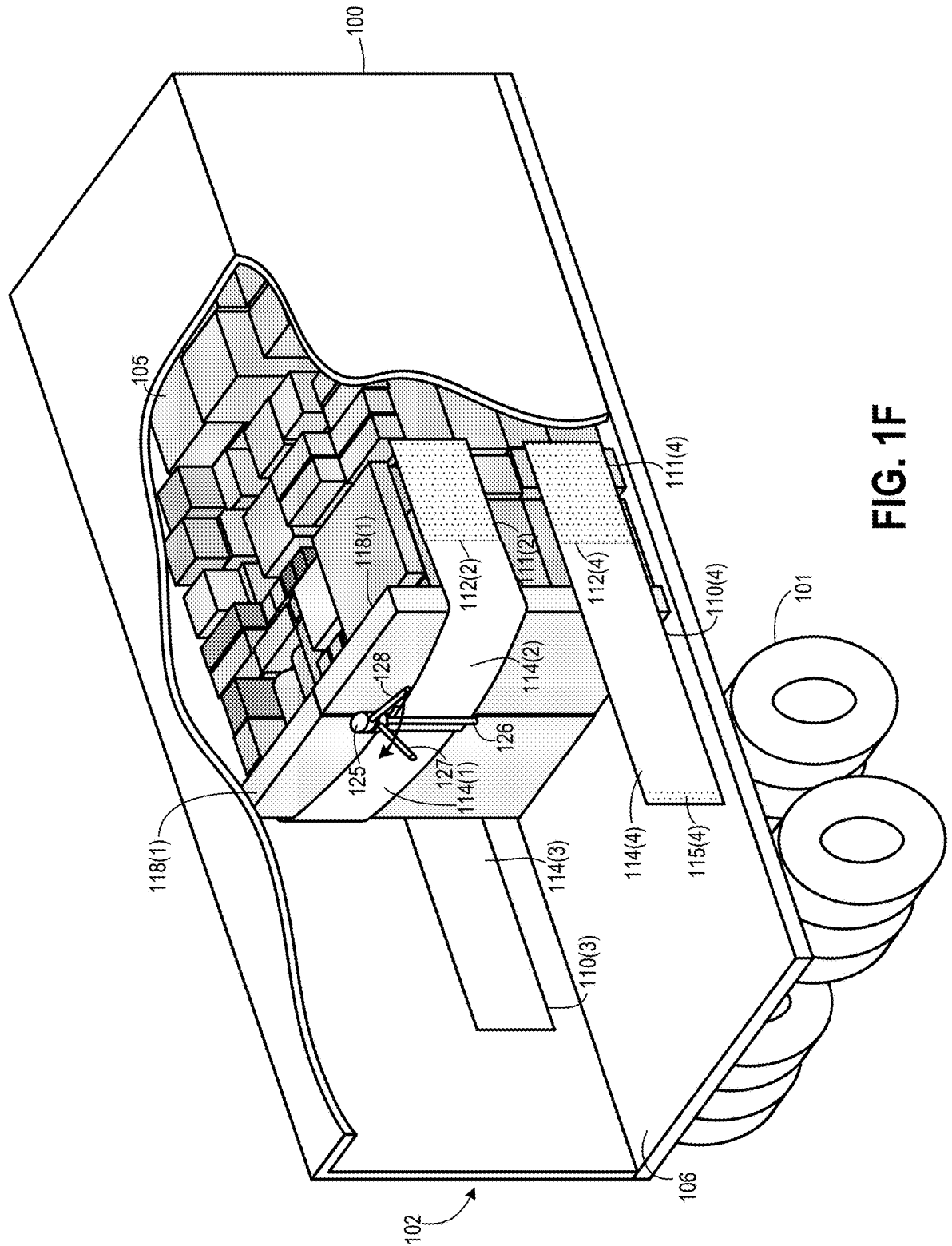
Figure 1G:
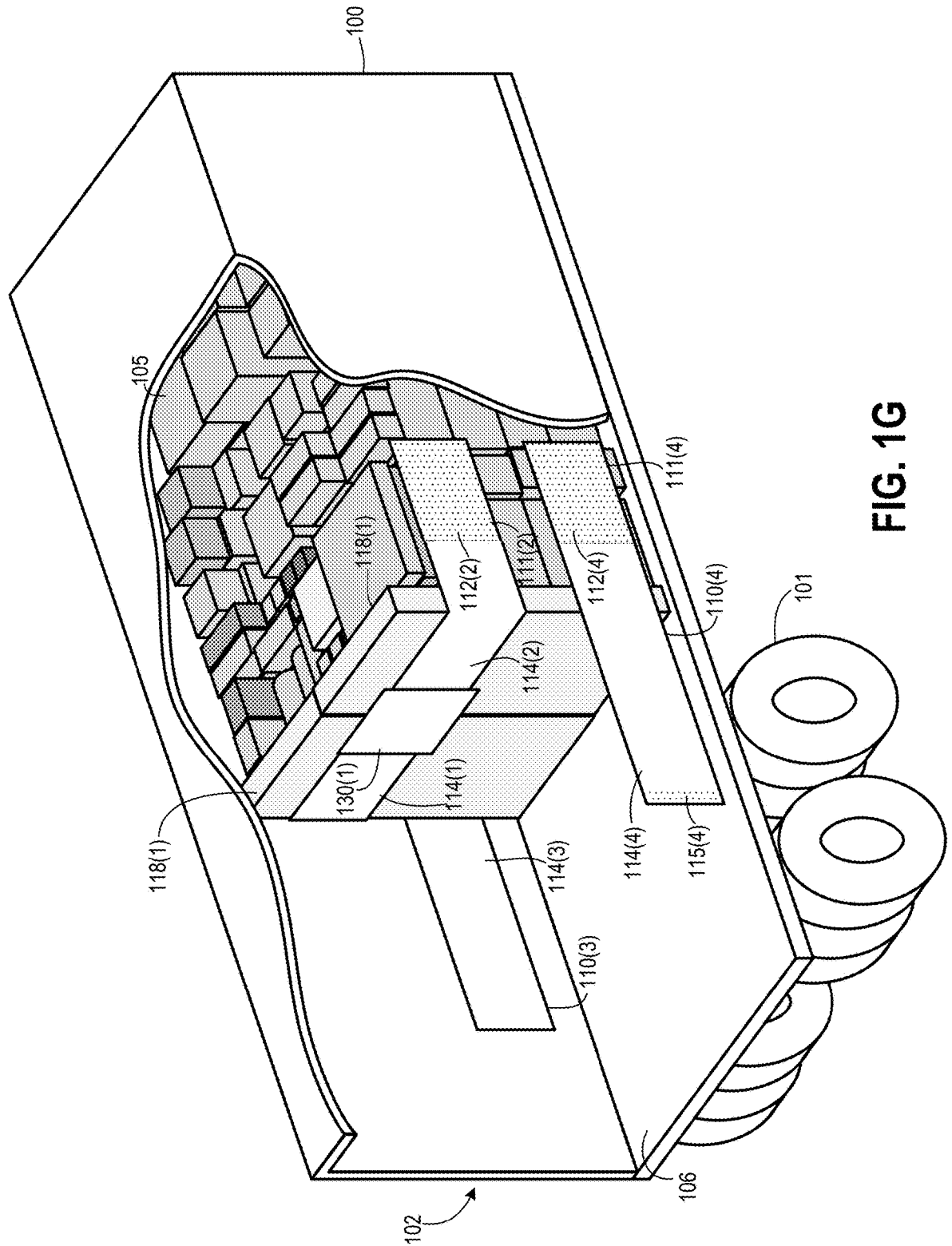

In FIG. 1F, a tightening tool 125 is placed over the tails 114(1) and 114(2). The tool 125 includes a pair of tines 126 that define a slot. Only one of the tines 126 is visible in FIG. 1F. The tines 126 of the tool 125 may be slid over the overlapped ends of the tails 114(1) and 114(2) so as to hold those overlapped ends in the slot between tines 126. After placement of tool 125, handle 127 is held stationary and handle 128 is rotated in the direction indicated. This rotates the tines 126 and draws the tails 114(1) and 114(2) together, thereby tensioning the tails 114(1) and 114(2) to apply force against the cargo restraint panels 118(1) and 118(1) and push the cargo restraint panels 118(1) and 118(1) against the stack of cargo units 105. The ends of the tails 114(1) and 114(2) may then be secured together by applying an adhesive backed connecting patch 130(1) over those ends, and the tool 125 removed, as shown in FIG. 1G. The connecting patch 130(1) may, for example, comprise a patch of material such as that sold under the name Ty-Patch 2000® by Walnut Industries, Inc. of Bensalem, PA, US. The connecting patch 130(1) may, for example, comprise a backing material, similar to that of the load restraint strips 110, with reinforcing fibers similar to those of the load restraint strips 110. An adhesive layer that contacts the tails 1141(1) and 114(2) may comprise an adhesive that is similar to that of the adhesive layers 112(2) and 114(4), or may comprise a different type of adhesive (e.g., a rubber cement selected to bond to surfaces the tails 114(1) and 114(2)).

Figure 1H:
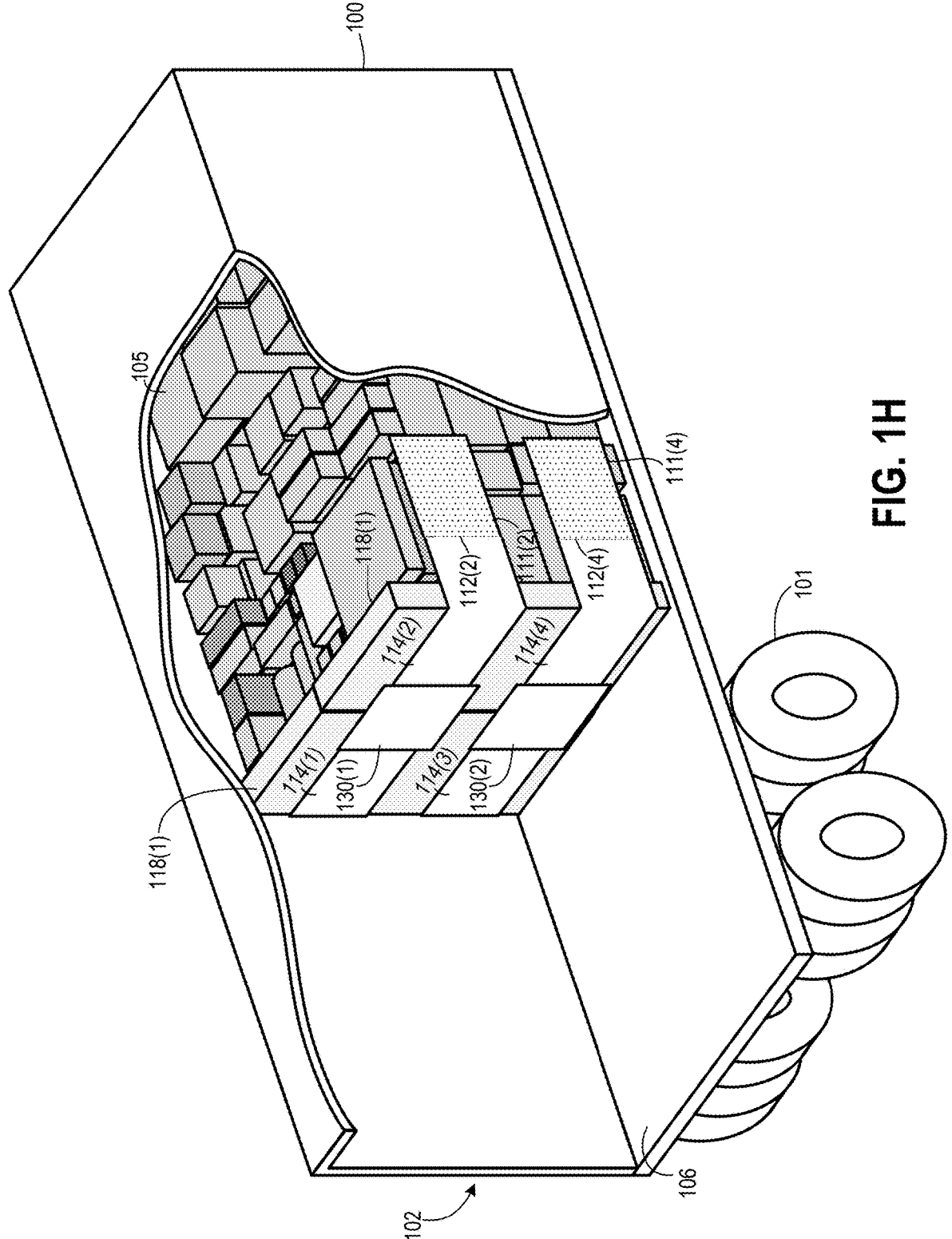

The tails 114(3) and 114(4) of the load restraint strips 110(3) and 110(4) may, in a manner similar to that shown in FIGS. 1E and 1F, be wrapped around the first and second cargo restraint panels 118(1) and 118(2) and tightened using the tool 125. A connecting patch 130(2) may be applied, in a manner similar to that described for the connecting patch 130(1), to the tightened tails 114(3) and 114(4), and the tool 125 removed, as shown in FIG. 1H. In the configuration shown in FIG. 1H, the load restraint strips 110 and the cargo restraint panels 118(1) and 118(2) provide dual mode securement of the cargo units 105. The cargo restraint panels 118(1) and 118(2) are securely held in position against the stack of cargo units 105 by the load restraint strips 110, but without need of special hardware or attachment mechanisms to connect the cargo restraint panels 118(1) and 118(2) to the walls, floor, or ceiling of the cargo container 100. The cargo restraint panels cargo restraint panels 118(1) and 118(2), while held against the cargo unit 105 stack by the load restraint strips 110, act as a secure bulkhead to prevent shifting of the cargo units during acceleration of the cargo container 100. When the cargo container 100 reaches its destination, the cargo restraint panels cargo restraint panels 118(1) and 118(2) can be easily removed by cutting the load restraint strips 110 with a knife (e.g., by cutting portions of the load restraint strips 110 between the cargo restraint panels 118 and interior walls of the cargo container 100). The cargo restraint panels 118, because of their foam cores, may be lightweight and easily handled. The cargo restraint panels may be reused.

Figure 2:
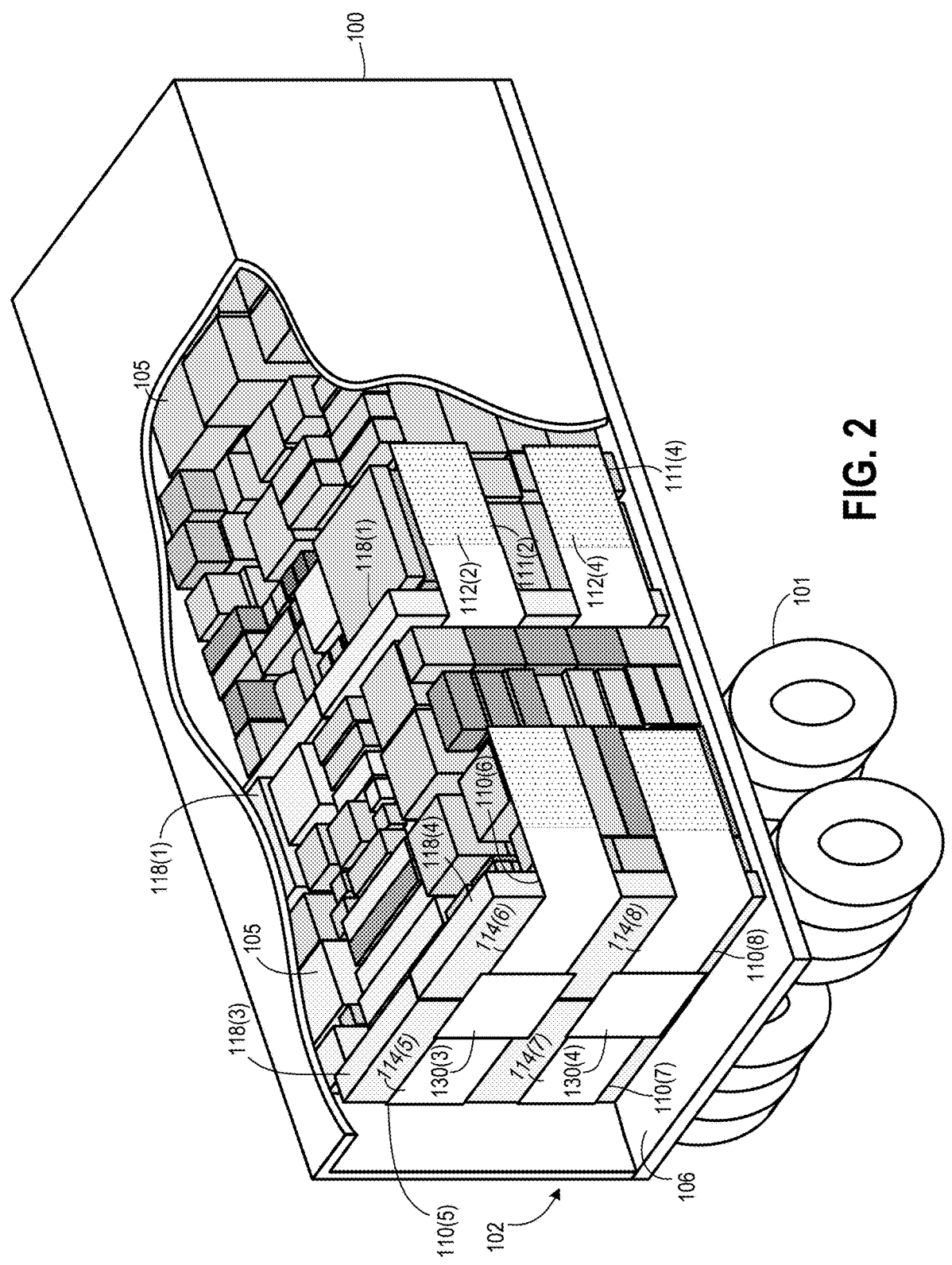
FIG. 2 shows an example of additional dual mode cargo restraint.

Although FIG. 1H shows a relatively large space behind the cargo restraint panels cargo restraint panels 118(1) and 118(2), this need not be the case. For example, prior to performing the operations explained above (e.g., before affixing the load restraint strips 110, placing the cargo restraint panels cargo restraint panels 118(1) and 118(2), etc.), additional cargo units 105 may be loaded, and the locations of the load restraint strips 110 and cargo restraint panels cargo restraint panels 118(1) and 118(2) may be rearward of where shown in FIG. 1H. Alternatively, the locations of the load restraint strips 110 and cargo restraint panels cargo restraint panels 118(1) and 118(2) may be forward of where shown in FIG. 1H (e.g., if fewer cargo units 105 are loaded in the forward portion of the cargo container 100. Also or alternatively, and as shown in FIG. 2, additional cargo units 105 may be loaded behind the cargo restraint panels 118(1) and (2). For example, and as shown in FIG. 2, a second stack of cargo units 105 begins immediately behind the cargo restraint panels 118(1) and 118(2). Attachment regions of load restraint strips 110(5) through 110(8) (which may be similar to the load restraint strips 110(1) through 110(4)) may then be affixed, similar to the affixation of the attachment regions 112(1) through 112(4) of the load restraint strips 110(1) through 110(4). Cargo restraint panels 118(3) and 118(4) (which may be similar to the cargo restraint panels 118(1) and 118(2)) may then be placed, similar to the placement of the cargo restraint panels 118(1) and 118(2), adjacent to the rear of the second stack of cargo units 105. Tails 114(5) and 114(6) of the load restraint strips 110(5) and 110(6), as well as tails 114(7) and 114(8) of the load restraint strips 110(7) and 110(8), may then be wrapped, tightened, and secured (with adhesive connecting patches 130(3) and 130(4)) similar to how tails 114(1) and 114(2) of load restraint strips 110(1) and 110(2) were wrapped, tightened, and secured.

As described above in connections with FIG. 1F, tails of load restraint strips, after wrapping around cargo restraint panels, may be tightened using a tool 125 to draw the tails together and create tension in the tails. This tension helps to firmly hold the cargo restraint panels in place. Because of the nature of many types of smaller, unpalletized cargo units that may be restrained using dual-mode cargo restraint, minimal tension may sufficient. For example, the cargo units 105 may comprise boxes or other containers that are generally lightweight, and the total mass of a stack may be such that substantial pre-tensioning of the tails is unnecessary. Moreover, if the cargo units 105 comprise cardboard cartons or other containers that are easily crushed or deformed, excessive tensioning of the tails may lead to excessive force against those cargo units and may cause damage.

Figure 3:
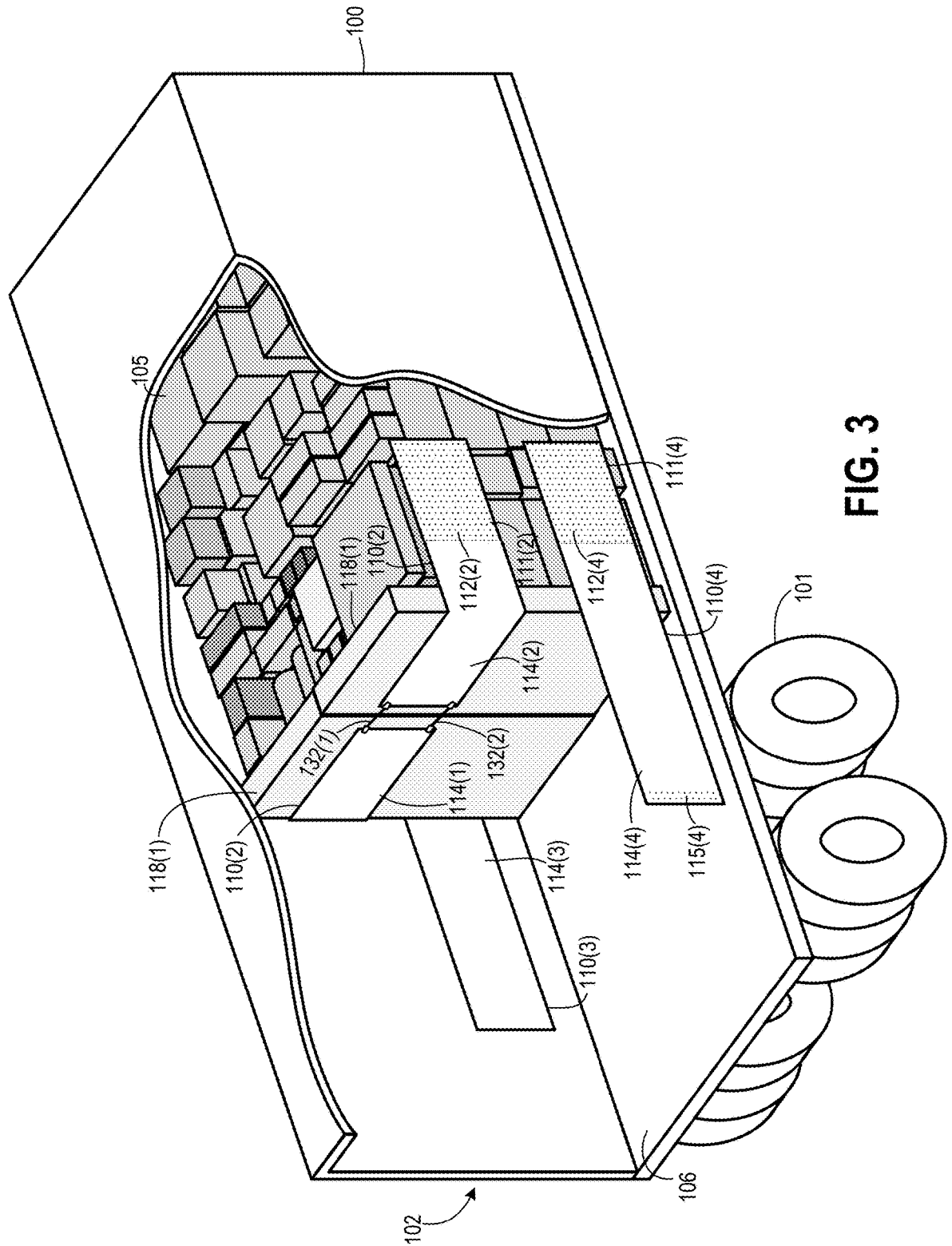
FIG. 3 shows an example of dual mode cargo restraint in which tails of load restraint strips are tensioned using elastic strips.

FIG. 3 shows an example of dual-mode cargo restraint in which tails of load restraint strips are tensioned without use of a tool such as the tightening tool 125. Instead, load restraint strip tails may be connected using tensioned elastic strips that pull the tails together with minimal force (e.g., 10 to 20 pounds). In the configuration of FIG. 3, the load restraint strips 110(1) through 110(4) have been affixed, and the cargo restraint panels 118(1) and 118(2) have been placed, in a manner similar to that described above. The tails 114(1) and 114(2) of the load restraint strips 110(1) and 110(2) have also been wrapped around the cargo restraint panels 118(1) and 118(2) in a manner similar to that described above. In FIG. 3, however, the ends of the tails 114(1) and 114(2) have been trimmed so that there is a gap (e.g., 6 to 12 inches) between the ends of the tails. Those ends are then connected using elastic strips 132(1) and 132(2).

Figure 4A:
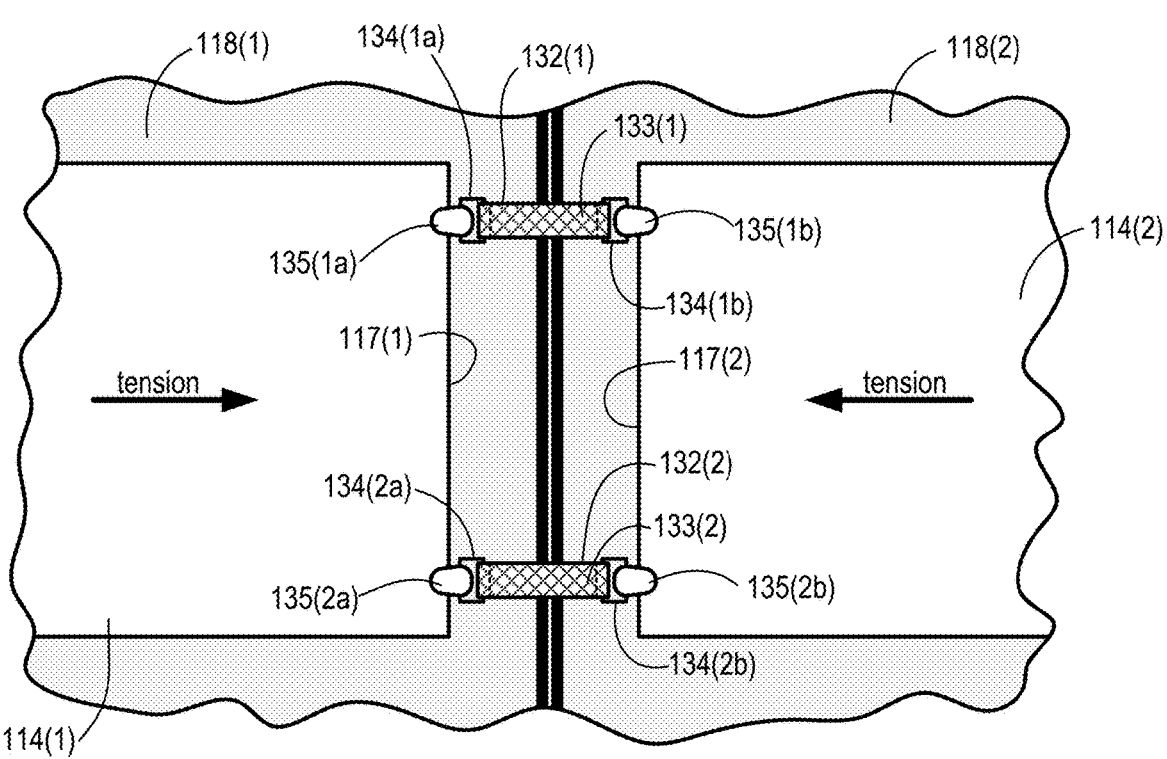
FIG. 4A shows an enlarged view of features shown in a portion of FIG. 3.

FIG. 4A shows an enlarged view of the ends of the tails 114(1) and 114(2), in FIG. 3, from a position immediately behind the cargo restraint panels 118(1) and 118(2). Elastic strip 132(1) comprises an elastic member 133(1) that is attached, via wire links 134(1a) and 134(1b), to clips 135(1a) and 135(1b). The elastic member 133(1) comprises a strip of material that, when elongated, creates tension that pulls the clips 135(1a) and 135(1b) together. Examples of material for the elastic member 133(1) may comprise rubber, combination polyester/rubber textiles, and/or other elastic materials. The clips 135(1a) and 135(1b) may be spring-loaded and openable to engage an edge of an end of a load restraint strip tail with a jaw of the clip, and closable to grip that edge. The jaws of clips 135(1a) and 135(1b) may comprise teeth to better grip that edge. The elastic strip 132(2) may be similar to the elastic strip 132(1) and may comprise an elastic member 133(2), wire links 134(2a) and 134(2b), and clips 135(2a) and 135(2b).

To connect the tails 114(1) and 114(2) together as shown in FIG. 4A, the clips 135(1a) and 135(2a) may be attached to the edge 117(1) of the tail 114(1). The clips 135(1b) and 135(2b) may then be pulled toward, and attached to, the edge 117(2) of the tail 114(2). The distance between the edges 117(1) and 117(2) may such that the elastic members 133(1) and 133(2) are elongated, thereby creating tension in the elastic members 133(1) and 133(2) that pulls the clips 135(1b) and 135(2b) (and attached edge 117(2)) toward the clips 135(1a) and 135(2a) (and attached edge 117(1)), and thereby tensioning the tails 114(1) and 114(2).

Figure 4B:
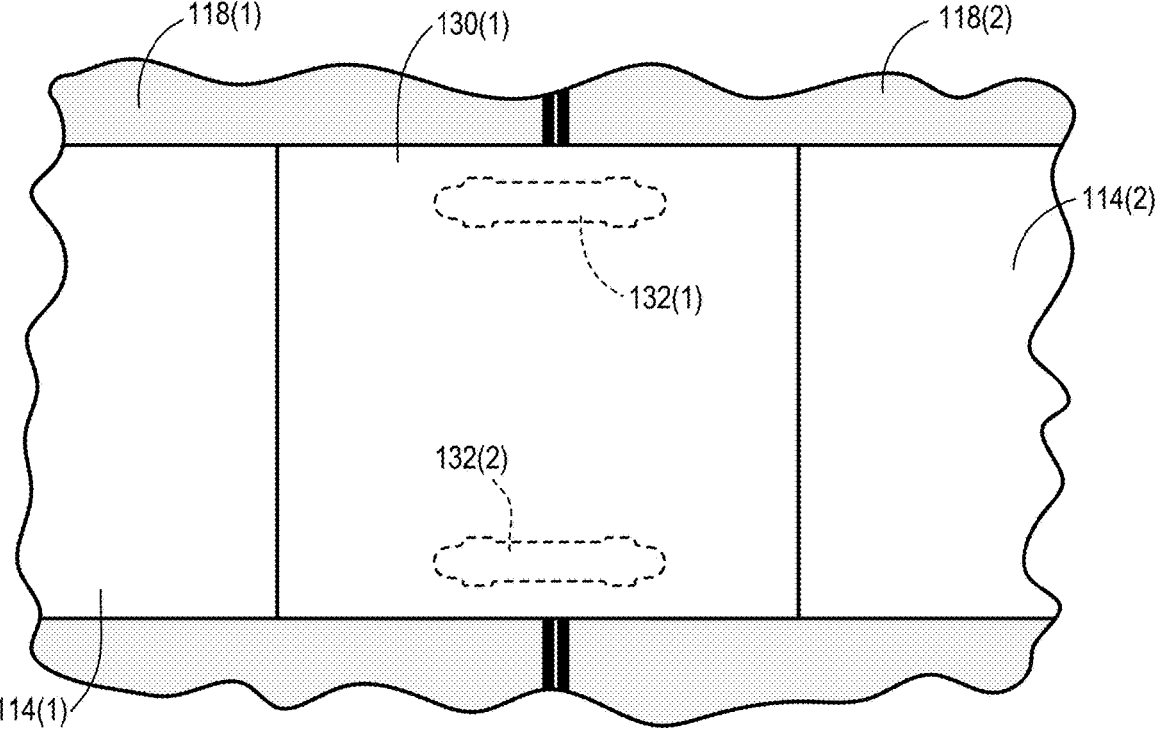
FIG. 4B shows an enlarged view, similar to that of FIG. 4A, after addition of a connecting patch.

After connecting the tails 114(1) and 114(2) together as shown in FIG. 4A, the tails 114(1) and 114(2) may be secured together by applying the connecting patch 130(1) to the ends of the tails 114(1) and 114(2). FIG. 4B shows an enlarged view of the ends of the tails 114(1) and 114(2) similar to FIG. 4A, but showing the connecting patch 130(1) adhered to the ends of the tails 114(1) and 114(2). The connecting patch 130(1) may also be adhered to the elastic strips 132(1) and 132(2) and to portions of the cargo restraint panels 118(1) and 118(2) exposed between the edges 117(1) and 117(2). However, the elastic strips 132(1) and 132(2) are relatively inexpensive and may be treated as disposable. Because the extent of the cargo restraint panels 118(1) and 118(2) contacted by adhesive from the connecting patch 130(1) is limited, the connecting patch may be largely or completely removeable from the cargo restraint panels 118(1) and 118(2). Tails 114(3) and 114(4) (FIG. 3) may similarly be connected and tensioned using elastic strips similar to elastic strips 132(1) and 132(2), and secured with a connecting patch.

Elastic strips may have configurations other than that shown in FIG. 4A. As indicated above, various types of elastic materials may be used. Any of various types of clips may be used. Clips may be attached to an elastic member in ways other than via wire links (e.g., riveting, gluing, and/or otherwise attaching tabs or other extensions of clips to ends of an elastic member). An elastic strip need not use clips and may be attached to load restraint strip tails in other ways.

Figure 5:
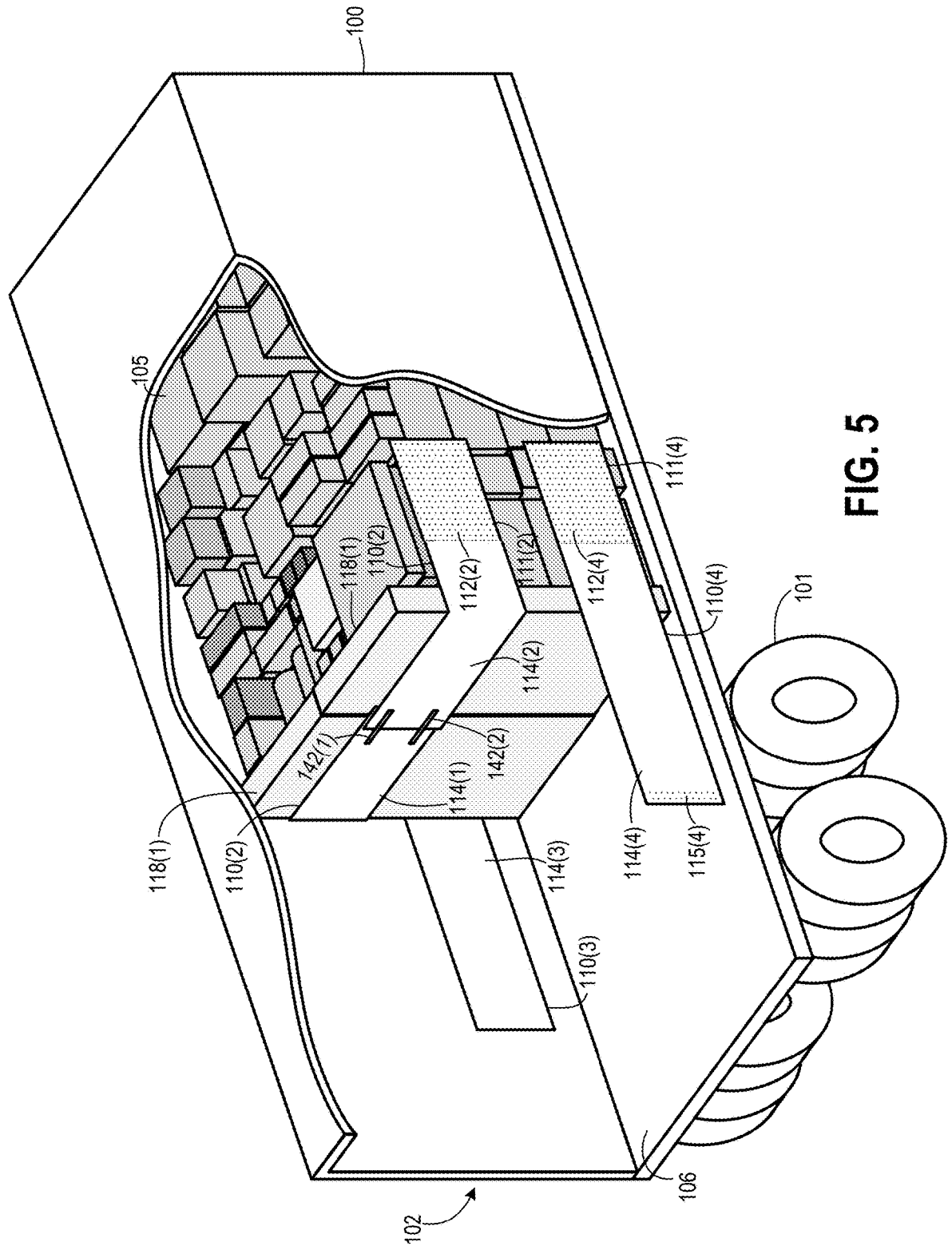
FIG. 5 shows another example of dual mode cargo restraint in which tails of load restraint strips are tensioned using elastic strips.

FIG. 5 shows an example of dual-mode cargo restraint using elastic strips without clips. In the configuration of FIG.

5, the load restraint strips 110(1) through 110(4) have been affixed, and the cargo restraint panels 118(1) and 118(2) have been placed, in a manner similar to that described above. The tails 114(1) and 114(2) of the load restraint strips 110(1) and 110(2) have also been wrapped around the cargo restraint panels 118(1) and 118(2) in a manner similar to that described above. In FIG. 5, however, the ends of the tails 114(1) and 114(2) have been connected using elastic strips 142(1) and 142(2).

Figure 6A:
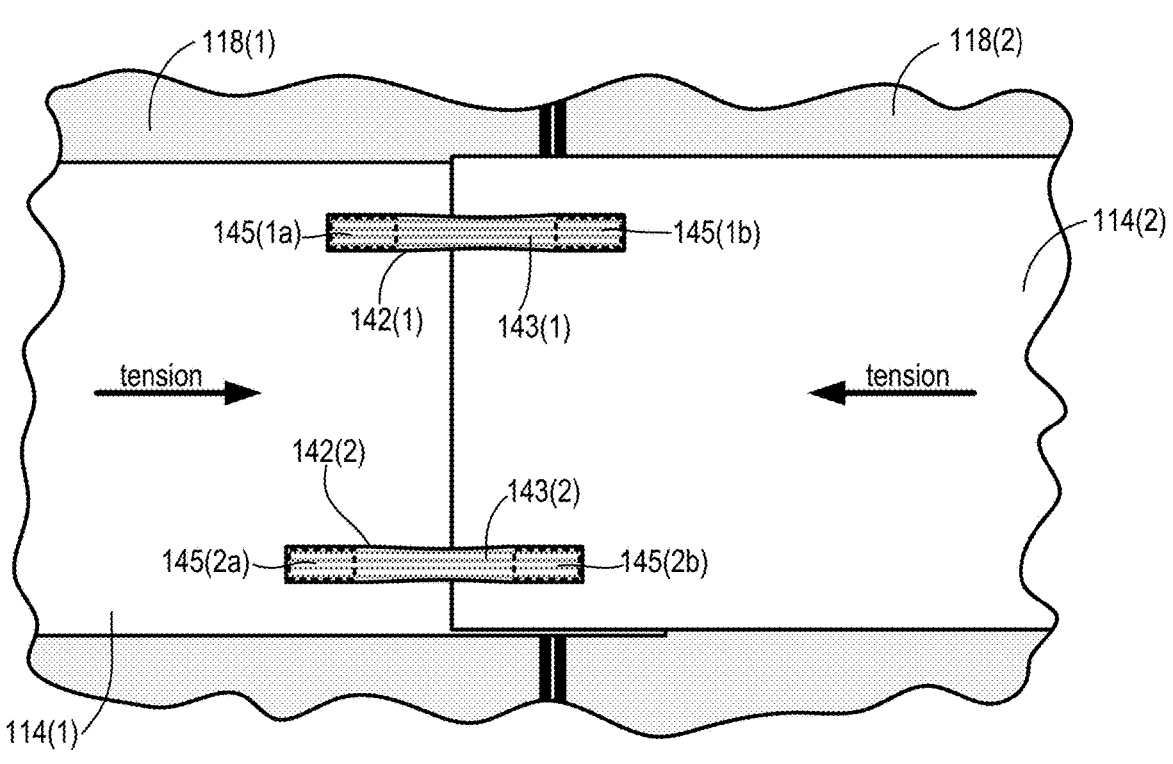
FIG. 6A shows an enlarged view of features shown in a portion of FIG. 5.

FIG. 6A shows an enlarged view of the ends of the tails 114(1) and 114(2), in FIG. 5, from a position immediately behind the cargo restraint panels 118(1) and 118(2). Elastic strip 142(1) comprises an elastic member 143(1). A surface of the elastic strip 142(1) configured to attach to load restraint strip tails, which surface is not visible in FIG. 6A, includes adhesive patches 145(1a) and 145(1b). The adhesive of patches 145(1a) and 145(1b) may be applied directly to the material of the elastic member 143(1), or may be applied to separate elements (e.g., flexible fabric or polymer sheets) that are sewn or otherwise attached to the elastic member 143(1). The elastic member 143(1) may comprise a strip of material that is similar to the material of the elastic member 133(1) and that, when elongated, creates tension that pulls the patches 145(1a) and 145(1b) together. The elastic strip 142(2) may be similar to the elastic strip 142(1) and may comprise an adhesive patches 145(2a) and 145(2b).

To connect the tails 114(1) and 114(2) together as shown in FIG. 6A, the adhesive patches 145(1a) and 145(2a) may be attached to the tail 114(1). The patches 145(1b) and 145(2b) may then be pulled toward, and attached to, the tail 114(2). The locations of attachment to the tail 114(2) may be selected such that the elastic members 143(1) and 143(2) are elongated, thereby creating tension in the elastic members 143(1) and 143(2) that pulls the patches 145(1b) and 145(2b) (and attached tail 114(2)) toward the patches 145(1a) and 145(2a) (and attached tail 114(1)), and thereby tensioning the tails 114(1) and 114(2).

Figure 6B:
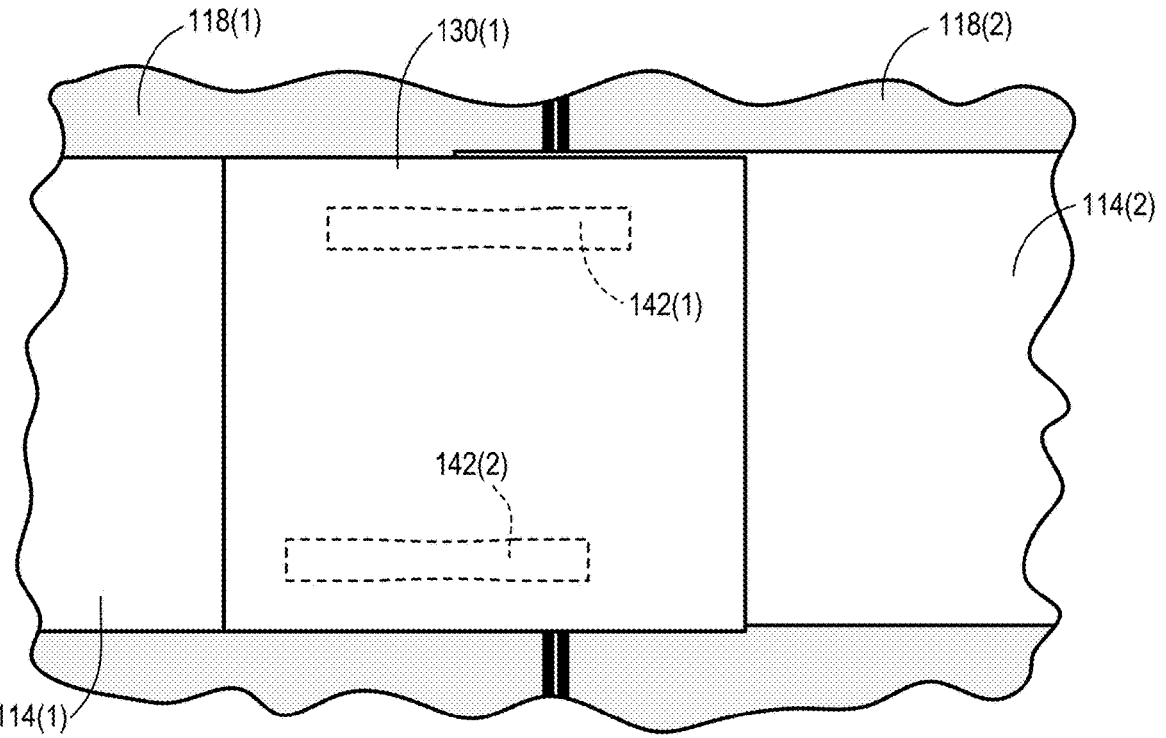
FIG. 6B shows an enlarged view, similar to that of FIG. 6A, after addition of a connecting patch.

After connecting the tails 114(1) and 114(2) together as shown in FIG. 6A, the tails 114(1) and 114(2) may be secured together by applying the connecting patch 130(1) to the ends of the tails 114(1) and 114(2). FIG. 6B shows an enlarged view of the ends of the tails 114(1) and 114(2) similar to FIG. 6A, but showing the connecting patch adhered to the ends of the tails 114(1) and 114(2). The connecting patch 130(1) may also be adhered to the elastic strips 142(1) and 142(2). However, the elastic strips 142(1) and 142(2) are relatively inexpensive and may be treated as disposable. Tails 114(3) and 114(4) (FIG. 5) may similarly be connected and tensioned using elastic strips similar to elastic strips 142(1) and 142(2), and secured with a connecting patch.

In the configuration of FIGS. 6A and 6B, there is no gap between the tails 114(1) and 114(2). Alternatively, a gap may be created, similar to that shown in FIG. 4A, prior to connecting the tails 114(1) and 114(2) using the elastic strips 142(1) and 142(2).

Although examples above show cargo two restraint panels used to create a bulkhead to secure cargo, more or fewer cargo restraint panels may be used. Similarly, and although examples above show two pairs of opposing load restraint strips used to hold cargo restraint panels in place, more or fewer pairs of opposing load restraint strips may be used.

Figure 7:
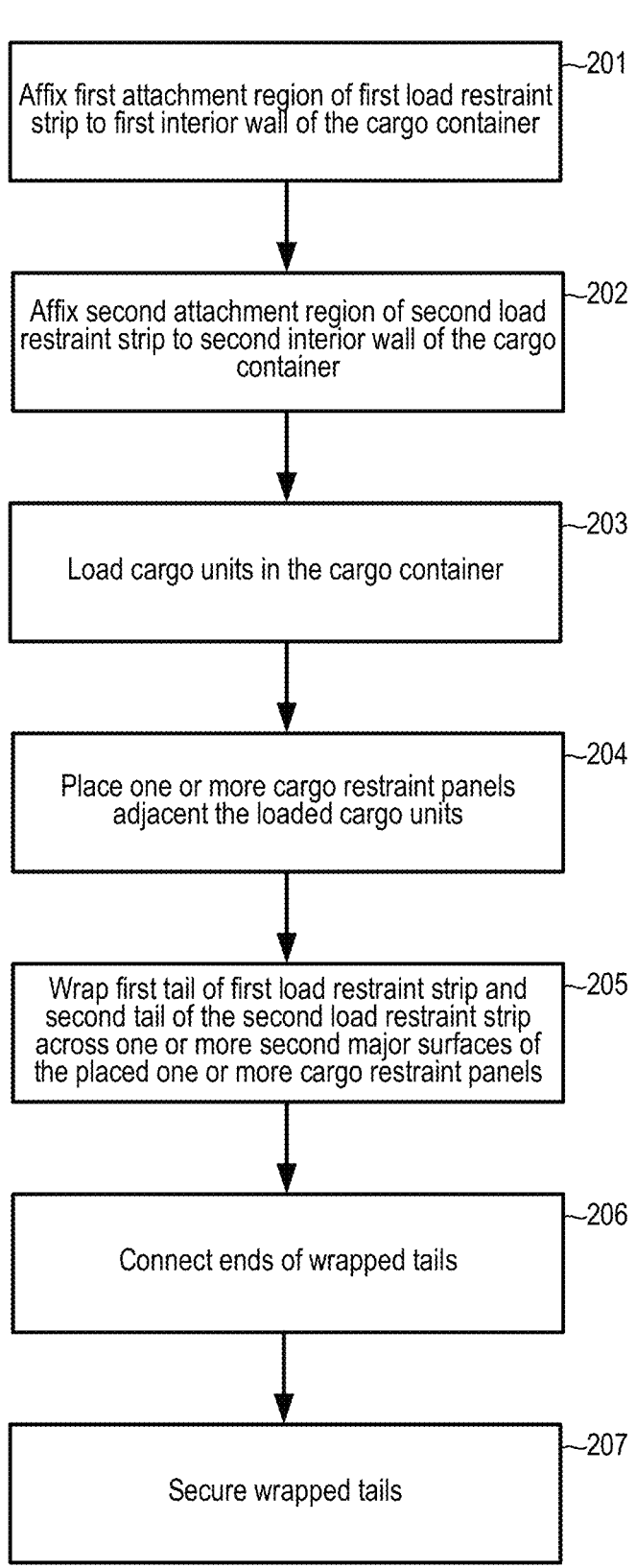
FIG. 7 is a block diagram showing steps of an example method for dual mode cargo restraint.

FIG. 7 is a block diagram showing steps of an example method for dual mode cargo restraint. In step 201, a first attachment region of a first load restraint strip may be affixed to a first interior wall of a cargo container. The first load restraint strip may comprise a first base layer, a first reinforcement layer fixed to the first base layer, and an exposed first adhesive layer in the first attachment region. An example of step 201 is affixing of the attachment region 111(1) of the load restraint strip 110(1) to the left interior wall of the cargo container 100. Step 201 may be repeated for one or more additional first load restraint strips (e.g., for the load restraint strip 110(2)).

In step 202, a second attachment region of a second load restraint strip may be affixed to a second interior wall of a cargo container. The second load restraint strip may comprise a second base layer, a second reinforcement layer fixed to the second base layer, and an exposed second adhesive layer in the second attachment region. An example of step 202 is affixing of the attachment region 111(2) of the load restraint strip 110(2) to the right interior wall of the cargo container 100. Step 201 may be repeated for one or more additional first load restraint strips (e.g., for the load restraint strip 110(4)).

In step 203, cargo units may be loaded in the cargo container. The loaded cargo units may be stacked to a height of at least four cargo units and to a width of at least four cargo units. An example of step 203 is loading of the cargo units 105 in the cargo container 100.

In step 204, one or more cargo restraint panels may be placed adjacent to the loaded cargo units. Each of the cargo restraint panels may comprise a polymer foam core, a first major surface facing the loaded cargo units, a second major surface facing away from the loaded cargo units, and sides connecting the first and second major faces. An example of step 204 is placing of the cargo restraint panels 118(1) and 118(2) in the cargo container 100.

In step 205, a first tail of the first load restraint strip and a second tail of the second load restraint strip may be wrapped across the one or more second major surfaces of the one or more cargo restraint panels. An example of step 205 is the wrapping of the tails 114(1) and 114(2) across the cargo restraint panels 118(1) and 118(2). Step 205 may be repeated for one or more additional pairs of first and second restraint strips (e.g., for the tails 114(3) and 114(4) of the load restraint strips 110(3) and 110(4)).

In step 206, ends of the wrapped first and second tails may be connected. Examples of this connecting include connecting using a tightening tool such as the tool 125 and connecting using elastic strips such as the elastic strips 132(1) and 132(2) and/or the elastic strips 142(1) and 142(2). Step 206 may be repeated for one or more additional pairs of first and second restraint strips (e.g., for the tails 114(3) and 114(4) of the load restraint strips 110(3) and 110(4)).

In step 207, the wrapped first tail may be secured to the wrapped second tail. An example of step 207 is applying the connecting patch 130(1) to the tails 114(1) and 114(2). Step 207 may be repeated for one or more additional pairs of first and second restraint strips (e.g., for the tails 114(3) and 114(4) of the load restraint strips 110(3) and 110(4)).

Figure 8:
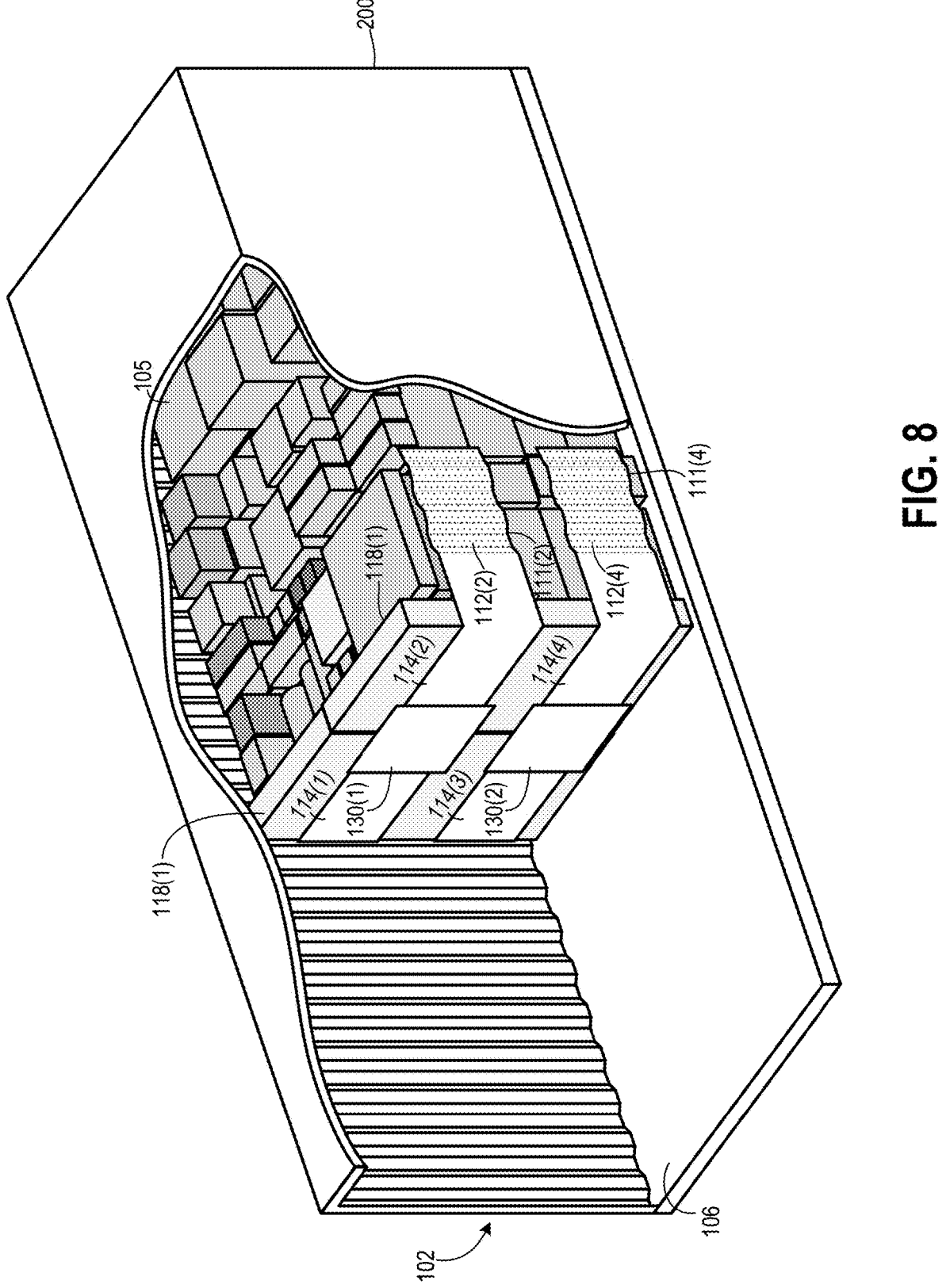
FIG. 8 shows another example of dual mode cargo restraint.

As explained above, dual mode cargo restraint such as is described herein may be used in any of various types of cargo containers. FIG. 8 shows an example of dual mode cargo restraint in another type of cargo container. FIG. 8 is similar to FIG. 1H, except that in FIG. 8 the dual mode cargo restraint shown in FIG. 1H has been used in a cargo container 200 that comprises a multi-mode shipping container.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

The invention claimed is:

1. A method of securing cargo in a cargo container, the method comprising:

affixing a first attachment region of a first load restraint strip to a first interior side wall of the cargo container, wherein the first load restraint strip comprises a first base layer, a first reinforcement layer fixed to the first base layer, and an exposed first adhesive layer in the first attachment region;

affixing a second attachment region of a second load restraint strip to a second interior side wall of the cargo container, wherein the second load restraint strip comprises a second base layer, a second reinforcement layer fixed to the second base layer, and an exposed second adhesive layer in the second attachment region;

loading cargo units in the cargo container, wherein the loaded cargo units are stacked to a height, in a vertical direction from a floor of the cargo container to an interior surface of a top of the cargo container, of at least four cargo units and to a width, in a horizontal direction from first interior side wall to the second interior side wall, of at least four cargo units;

placing one or more cargo restraint panels adjacent to the loaded cargo units, each of the one or more cargo restraint panels comprising a polymer foam core, a first major surface facing the loaded cargo units, a second major surface facing away from the loaded cargo units, and sides connecting the first and second major surfaces;

after placing the one or more cargo restraint panels, horizontally wrapping a first tail of the first load restraint strip and a second tail of the second load restraint strip across, and in contact with, the one or more second major surfaces of the placed one or more cargo restraint panels; and securing the wrapped first tail to the wrapped second tail, wherein the horizontally wrapping and the securing are performed without use of a tool to apply tension to the first and second tails.

2. The method of claim 1, wherein the one or more cargo restraint panels comprises two cargo restraint panels, wherein the first major surfaces of the two cargo restraint panels contact portions of a portion of the loaded cargo units, wherein the first tail, after securing to the second tail, contacts the second major surface of one of the two cargo restraint panels, and wherein the second tail, after securing to the first tail, contacts the second major surface of the other of the two cargo restraint panels.

3. The method of claim 1, wherein the one or more cargo restraint panels are not mechanically interlocked with a floor of the cargo container, a ceiling of the cargo container, or side walls of the cargo container.

4. The method of claim 1, wherein an average volume of the cargo units is 3.375 cubic feet or less per cargo unit.

5. The method of claim 1, further comprising:

after wrapping the first tail and the second tail around the one or more cargo restraint panels, attaching a first connector of a tensioning strip to the first tail and a second connector of the tensioning strip to the second tail, wherein the tensioning strip comprises an elastic material strip that creates tension when elongated, a first end of the elastic material strip is fixed to the first connector, and a second end of the elastic material strip is fixed to the second connector.

6. The method of claim 5, wherein the first connector comprises a first clip that grips the first tail after the attaching to the first tail, the second connector comprises a second clip that grips the second tail after the attaching to the second tail, and the elastic material strip pulls the first clip toward the second clip after the attaching to the first tail and the attaching to the second tail.

7. The method of claim 5, wherein the first connector comprises a first adhesive patch that is adhered to the first tail after the attaching to the first tail, the second connector comprises a second adhesive patch that is adhered to the second tail after the attaching to the second tail, and the elastic material strip pulls the first adhesive patch toward the second adhesive patch after the attaching to the first tail and the attaching to the second tail.

8. The method of claim 5, wherein securing the first tail to the second tail comprises adhering an adhesive-backed patch to the first tail, the second tail, and the attached tensioning strip.

9. The method of claim 1, wherein the cargo container comprises a semi trailer.

10. A method of securing cargo in a cargo container, the method comprising:

affixing a first attachment region of a first load restraint strip to a first interior side wall of the cargo container, wherein the first load restraint strip comprises a first base layer, a first reinforcement layer fixed to the first base layer, and an exposed first adhesive layer in the first attachment region;

affixing a second attachment region of a second load restraint strip to a second interior side wall of the cargo container, wherein the second load restraint strip comprises a second base layer, a second reinforcement layer fixed to the second base layer, and an exposed second adhesive layer in the second attachment region;

loading cargo units in the cargo container;

placing one or more cargo restraint panels adjacent to the loaded cargo units, each of the one or more cargo restraint panels comprising a polymer foam core, a first major surface facing the loaded cargo units and contacting a portion of the loaded cargo units, a second major surface facing away from the loaded cargo units, and sides connecting the first and second major surfaces;

after placing the one or more cargo restraint panels, wrapping a first tail of the first load restraint strip and a second tail of the second load restraint strip across, and in contact with, the one or more second major surfaces of the one or more cargo restraint panels; and after wrapping the first tail and the second tail around the one or more cargo restraint panels, attaching a first connector of a tensioning strip to the first tail and a second connector of the tensioning strip to the second tail, wherein the tensioning strip comprises an elastic material strip that creates tension when elongated, a first end of the elastic material strip is fixed to the first connector, and a second end of the elastic material strip is fixed to the second connector.

11. The method of claim 10, wherein the first connector comprises a first clip that grips gripping the first tail after the attaching to the first tail, the second connector comprises a second clip that grips the second tail after the attaching to the second tail, and the elastic material strip pulls the first clip toward the second clip after the attaching to the first tail and the attaching to the second tail.

12. The method of claim 10, wherein the first connector comprises a first adhesive patch that is adhered to the first tail after the attaching to the first tail, the second connector comprises a second adhesive patch that is adhered to the second tail after the attaching to the second tail, and the elastic material strip pulls the first adhesive patch toward the second adhesive patch after the attaching to the first tail and the attaching to the second tail.

13. The method of claim 10, further comprising adhering an adhesive-backed patch to the first tail, the second tail, and the attached tensioning strip.

14. The method of claim 10, wherein the one or more cargo restraint panels comprises two cargo restraint panels, wherein the first major surfaces of the two cargo restraint panels contact portions of a portion of the loaded cargo units, wherein the first tail, after the wrapping of the first tail and the second tail around the one or more cargo restraint panels, contacts the second major surface of one of the two cargo restraint panels, and wherein the second tail, after the wrapping of the first tail and the second tail around the one or more cargo restraint panels, contacts the second major surface of the other of the two cargo restraint panels.

15. The method of claim 10, wherein the one or more cargo restraint panels are not mechanically interlocked with a floor of the cargo container, a ceiling of the cargo container, or side walls of the cargo container.

16. The method of claim 10, wherein the cargo container comprises a semi trailer.

17. An article comprising:

a cargo container;

a first load restraint strip comprising a first attachment region affixed to a first interior side wall of the cargo container, wherein the first load restraint strip comprises a first base layer, a first reinforcement layer fixed to the first base layer, and an adhesive layer in the first attachment region adhering the first attachment region to the first interior side wall;

a second load restraint strip comprising a second attachment region affixed to a second interior side wall of the cargo container, wherein the second load restraint strip comprises a second base layer, a second reinforcement layer fixed to the second base layer, and an adhesive layer in the second attachment region adhering the second attachment region to the second interior side wall;

cargo units loaded in the cargo container and stacked to a height, in a vertical direction from a floor of the cargo container to an interior surface of a top of the cargo container, of at least four cargo units and to a width, in a horizontal direction from first interior side wall to the second interior side wall, of at least four cargo units;

one or more cargo restraint panels adjacent the loaded cargo units, each of the one or more cargo restraint panels comprising a polymer foam core, a first major surface facing the loaded cargo units, a second major surface facing away from the loaded cargo units, and sides connecting the first and second major surfaces; and a tensioning strip comprising an elastic material strip that creates tension when elongated, a first connector fixed to a first end of the elastic material strip, and a second connector fixed to a second end of the elastic material strip, wherein a first tail of the first load restraint strip and a second tail of the second load restraint strip are horizontally wrapped across, and are in contact with, the one or more second major surfaces of the one or more cargo restraint panels, and wherein the first connector is attached to the first tail and the second connector is attached to the second tail.

18. The article of claim 17, wherein the one or more cargo restraint panels comprises two cargo restraint panels, wherein the first major surfaces of the two cargo restraint panels contact portions of a portion of the loaded cargo units, wherein the first tail contacts the second major surface of one of the two cargo restraint panels, and wherein the second tail contacts the second major surface of the other of the two cargo restraint panels.

19. The article of claim 17, wherein the first connector comprises a first adhesive patch and the second connector comprises a second adhesive patch.

20. The article of claim 17, further comprising an adhesive-backed patch adhered to the first tail, the second tail, and the tensioning strip.

\* \* \* \* \*